US012245101B2

(12) United States Patent
Zorgui et al.

(10) Patent No.: US 12,245,101 B2
(45) Date of Patent: Mar. 4, 2025

(54) LOCATION INDICATION FOR UPLINK RESOURCES FOR POSITIONING

(71) Applicant: QUALCOMM Incorporated, San Diego, CA (US)

(72) Inventors: Marwen Zorgui, San Diego, CA (US); Srinivas Yerramalli, San Diego, CA (US); Mohammed Ali Mohammed Hirzallah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 17/822,047

(22) Filed: Aug. 24, 2022

(65) Prior Publication Data

US 2024/0073644 A1  Feb. 29, 2024

(51) Int. Cl.
*H04W 4/029* (2018.01)
*H04L 5/00* (2006.01)

(52) U.S. Cl.
CPC ........... *H04W 4/029* (2018.02); *H04L 5/0035* (2013.01)

(58) Field of Classification Search
CPC .............................. H04W 4/029; H04L 5/0035
See application file for complete search history.

(56) References Cited

U.S. PATENT DOCUMENTS

| | | | | |
|---|---|---|---|---|
| 11,737,030 B2* | 8/2023 | Li | ....................... | H04W 52/146 |
| | | | | 455/522 |
| 12,167,298 B2* | 12/2024 | Gangakhedkar | ...... | H04W 4/025 |
| 2020/0154240 A1* | 5/2020 | Edge | ..................... | H04W 4/029 |
| 2020/0225309 A1* | 7/2020 | Manolakos | ............. | H04L 5/005 |
| 2020/0229125 A1* | 7/2020 | Manolakos | ....... | H04W 56/0045 |
| 2020/0275236 A1* | 8/2020 | Gangakhedkar | ...... | G01S 19/252 |
| 2021/0051442 A1* | 2/2021 | Manolakos | ........... | G01S 1/0428 |
| 2021/0099965 A1* | 4/2021 | Manolakos | ........... | G01S 13/878 |
| 2021/0185632 A1* | 6/2021 | Manolakos | ........... | H04L 5/0094 |
| 2021/0219103 A1* | 7/2021 | Wang | .................... | G01S 5/0236 |
| 2021/0274458 A1* | 9/2021 | Edge | ..................... | H04W 64/00 |

(Continued)

OTHER PUBLICATIONS

CATT: "Consideration on Positioning Accuracy Improvement", 3GPP TSG-RAN WG3 Meeting #114bis-e, R3-220718,3rd Generation Partnership Project, Mobile Competence Centre, 650, Route Des Lucioles, F-06921 Sophia-Antipolis Cedex, France, vol. RAN WG3, No. Online, Jan. 17, 2022-Jan. 26, 2022, Jan. 7, 2022, 8 Pages, XP052099180, Section 2.1, pp. 1-3.

(Continued)

*Primary Examiner* — Melanie Jagannathan
(74) *Attorney, Agent, or Firm* — Thien T. Nguyen

(57) ABSTRACT

In some implementations, an example method of wireless communication at a base station for wireless positioning a user equipment (UE) may comprise: transmitting, to a different device, assistance indicating a location of antenna reference points (ARPs) of the base station for a first set of TRPs configured for receiving uplink (UL) sounding reference signals (SRSs) different from a location of antenna reference points (ARPs) of the base station for a second set of TRPs configured for transmitting downlink (DL) position reference signals (PRSs). The method also comprises performing a measurement of a UL reference signal received by the first set of TRPs. And the method further comprises transmitting the measurement to the different device.

26 Claims, 13 Drawing Sheets

(56) References Cited

U.S. PATENT DOCUMENTS

| | | | | |
|---|---|---|---|---|
| 2022/0236404 | A1* | 7/2022 | Gunnarsson | G01S 13/765 |
| 2022/0321176 | A1* | 10/2022 | Vieira | H04B 7/0695 |
| 2023/0024368 | A1* | 1/2023 | Gunnarsson | H04W 64/00 |
| 2023/0111603 | A1* | 4/2023 | Ghimire | H04B 7/0421 |
| | | | | 455/456.1 |
| 2023/0300660 | A1* | 9/2023 | Zheng | H04L 5/0048 |
| | | | | 370/252 |
| 2023/0344589 | A1* | 10/2023 | Shreevastav | H04L 5/0023 |
| 2024/0045053 | A1* | 2/2024 | Farag | H04W 24/08 |
| 2024/0098544 | A1* | 3/2024 | Pan | G01S 5/0205 |
| 2024/0098740 | A1* | 3/2024 | Muruganathan | H04L 5/0044 |
| 2024/0098752 | A1* | 3/2024 | Chen | H04W 72/12 |
| 2024/0155517 | A1* | 5/2024 | Wang | H04W 52/58 |
| 2024/0159855 | A1* | 5/2024 | Saini | H04W 64/003 |
| 2024/0178939 | A1* | 5/2024 | Davydov | H04L 5/0094 |
| 2024/0224219 | A1* | 7/2024 | Lee | H04W 64/00 |
| 2024/0272267 | A1* | 8/2024 | Lomayev | H04W 64/00 |

OTHER PUBLICATIONS

International Search Report and Written Opinion—PCT/US2023/069423—ISA/EPO—Oct. 17, 2023.
OPPO: "Enhancements for UL AoA Positioning", 3GPP TSG RAN WG1 #106bis-e, R1-2109052, 3rd Generation Partnership Project, Mobile Competence Centre, 650, Route Des Lucioles, F-06921 Sophia-Antipolis Cedex, France, vol. RAN WGI, No. e-Meeting, Oct. 11, 2021-Oct. 19, 2021,Oct. 1, 2021, 4 pages, XP052058013, Section 3, p. 2.

\* cited by examiner

LOCATION INDICATION FOR UPLINK RESOURCES FOR POSITIONING

BACKGROUND

1. Field of Disclosure

The present disclosure relates generally to the field of wireless communications, and more specifically to determining the location of a User Equipment (UE) using radio frequency (RF) signals.

2. Description of Related Art

In a Fifth Generation (5G) New Radio (NR) mobile communication network, a UE may transmit an uplink (UL) signal (e.g., Sounding Reference Signal (SRS)) that can be received by base stations and/or other Transmission/Reception Points (TRPs) to make angle and/or distance measurements to determine the location of the UE using any of a variety of positioning methods. A precise coordinate of the antenna reference points for TRPs receiving the SRSs can result in an increase in accuracy of the determined position for the UE.

BRIEF SUMMARY

An example method of wireless communication at a base station for wireless positioning a user equipment (UE), the method comprising: transmitting, to a different device, assistance indicating a location of antenna reference points (ARPs) of the base station for a first set of TRPs configured for receiving uplink (UL) sounding reference signals (SRSs) different from a location of antenna reference points (ARPs) of the base station for a second set of TRPs configured for transmitting downlink (DL) position reference signals (PRSs). The method also comprises performing a measurement of a UL reference signal received by the first set of TRPs. And the method further comprises transmitting the measurement to the different device.

An example method of wireless communication at a UE for wireless positioning, the method comprising: transmitting a UL reference signal to a base station. The method also comprises receiving, from a network node, assistance data indicating a location of antenna reference points (ARPs) of the base station for a first set of TRPs configured for receiving uplink (UL) sounding reference signals (SRSs) different from a location of antenna reference points (ARPs) of the base station for a second set of TRPs configured for transmitting downlink (DL) position reference signals (PRSs).

An example base station. for wireless positioning a user equipment (UE) comprising: a transceiver, a memory, and one or more processing units communicatively coupled with the transceiver and the memory. The one or more processing units is configured to: transmit, to a different device, assistance indicating a location of antenna reference points (ARPs) of the base station for a first set of TRPs configured for receiving uplink (UL) sounding reference signals (SRSs) different from a location of antenna reference points (ARPs) of the base station for a second set of TRPs configured for transmitting downlink (DL) position reference signals (PRSs). The one or more processing units is also configured to perform a measurement of a UL reference signal received by the first set of TRPs; and transmit the measurement to the different device.

An example user equipment (UE) for wireless positioning comprising: a transceiver, a memory, and one or more processing units communicatively coupled with the transceiver and the memory. The one or more processing units is configured to: transmit a UL reference signal to a base station, and receive, from a network node, assistance data indicating a location of antenna reference points (ARPs) of the base station for a first set of TRPs configured for receiving uplink (UL) sounding reference signals (SRSs) different from a location of antenna reference points (ARPs) of the base station for a second set of TRPs configured for transmitting downlink (DL) position reference signals (PRSs).

Figure 1:
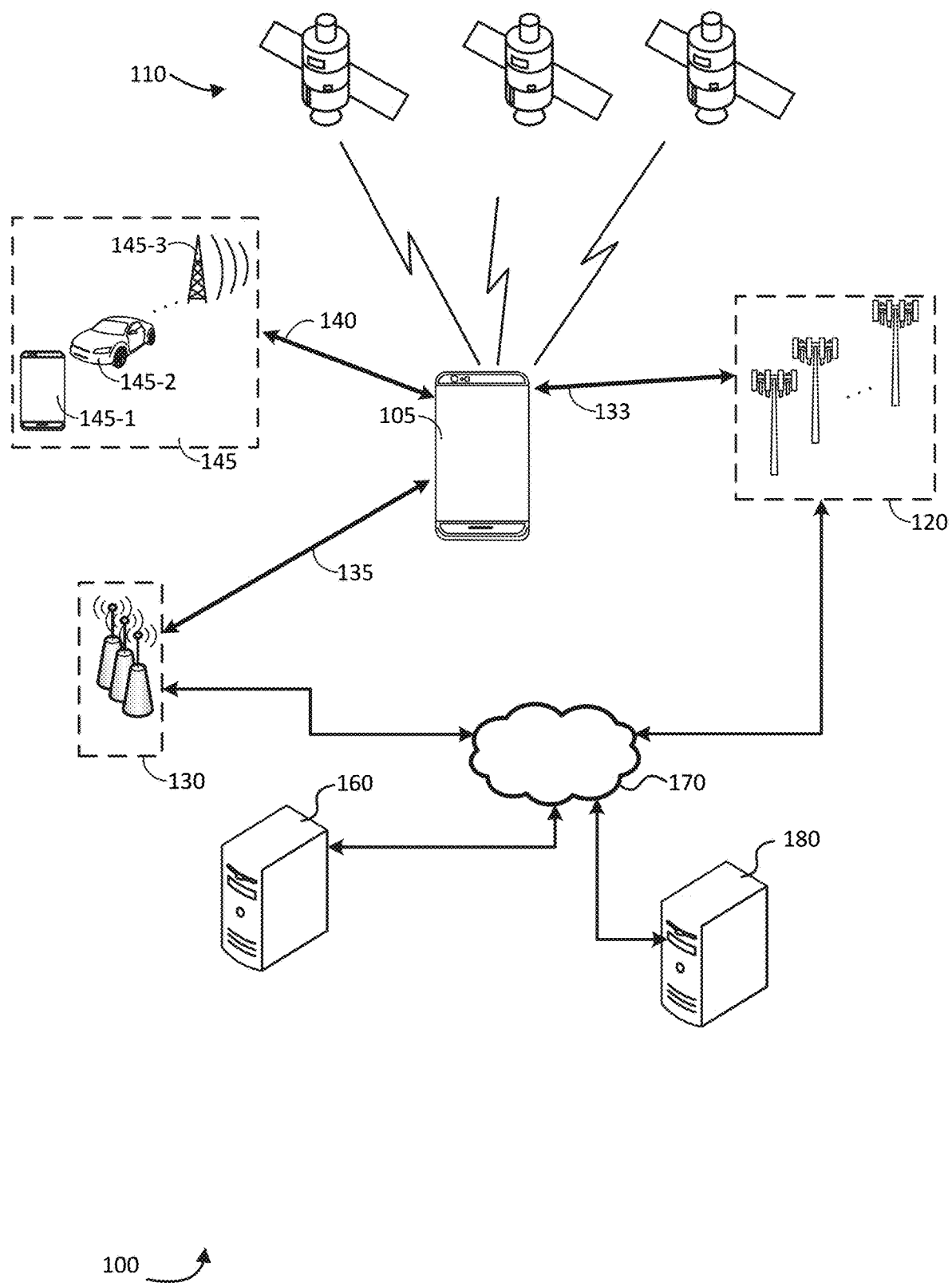
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

Further, unless otherwise specified, the term "positioning" as used herein may absolute location determination, relative location determination, ranging, or a combination thereof. Such positioning may include and/or be based on timing, angular, phase, or power measurements, or a combination thereof (which may include RF sensing measurements) for the purpose of location or sensing services.

In wireless communication network, when positioning a UE, location measurements (e.g., angle of arrival (AOA), angle of departure (AOD), Time of Arrival (TOA)) may be determined based on reference signals transmitted between base stations and the UE to be positioned. For example, such signals may comprise PRSs or SRSs, which can be used, for example, to execute Observed Time Difference Of Arrival (OTDOA), AOD, and round trip signal propagation delay (RTT)-based positioning of the UE.

At the base station, the transmission and reception of the reference signals (e.g., the transmission of the downlink (DL) PRSs and the reception of the uplink (UL) SRSs) are performed using TRP(s). However, in many implementations, the transmission point of the TRP and the reception point of the TRP are separated in order to increase the system's performance. For example, in sub-band full-duplex (SBFD) multiple-input and multiple-output (MIMO) systems, the TRP transmission panel and the TRP reception panel are separated to mitigate the DL and UL interference. Also, for a full-duplex gNB that allocates SRS resources in UL band of full-duplex slots, the reception point of the TRP is expected to be different than the transmission point of the same TRP. Accordingly, for improving an accuracy of positioning the UEs (e.g., increase the accuracy of the angle and/or distance measurements of the reference signals), the coordinate/location of both the antenna reference point (ARP) of the DL PRS resources and the ARP of the UL SRS resources may be reported by the base station. Additional details are provided herein.

FIG. 1 is a simplified illustration of a positioning system 100 in which a UE 105, location server 160, and/or other components of the positioning system 100 can use the techniques provided herein for positioning a user equipment (UE), according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

Satellites 110 may be utilized for positioning of the UE 105 in one or more ways. For example, satellites 110 (also referred to as space vehicles (SVs)) may be part of a Global Navigation Satellite System (GNSS) such as the Global Positioning System (GPS), GLONASS, Galileo or Beidou. Positioning using RF signals from GNSS satellites may comprise measuring multiple GNSS signals at a GNSS receiver of the UE 105 to perform code-based and/or carrier-based positioning, which can be highly accurate. Additionally or alternatively, satellites 110 may be utilized for Non-Terrestrial Network (NTN)-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations 120, and may be coordinated by a location server 160. In some embodiments, satellites 110 used for NTN-based positioning may be different than those used for GNSS-based positioning.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the UE 105, or a combination thereof. Wireless signals from mobile devices 145 used for positioning of the UE 105 may comprise RF signals using, for example, Bluetooth® (including Bluetooth Low Energy (BLE)), IEEE 802.11x (e.g., Wi-Fi®), Ultra-Wideband (UWB), IEEE 802.15x, or a combination thereof. Mobile devices 145 may additionally or alternatively use non-RF wireless signals for positioning of the UE 105, such as infrared signals or other optical technologies.

Mobile devices 145 may comprise other UEs communicatively coupled with a cellular or other mobile network (e.g., network 170). When one or more other mobile devices 145 comprising UEs are used in the position determination of a particular UE 105, the UE 105 for which the position is to be determined may be referred to as the "target UE," and each of the other mobile devices 145 used may be referred to as an "anchor UE." For position determination of a target UE, the respective positions of the one or more anchor UEs may be known and/or jointly determined with the target UE. Direct communication between the one or more other mobile devices 145 and UE 105 may comprise sidelink and/or similar Device-to-Device (D2D) communication technologies. Sidelink, which is defined by 3GPP, is a form of D2D communication under the cellular-based LTE and NR standards. UWB may be one such technology by which the positioning of a target device (e.g., UE 105) may be facilitated using measurements from one or more anchor devices (e.g., mobile devices 145).

According to some embodiments, such as when the UE 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The UE 105 illustrated in FIG. 1 may correspond to a component or device on a vehicle, RSU, or other V2X entity that is used to communicate V2X messages. In embodiments in which V2X is used, the static communication/positioning device 145-3 (which may correspond with an RSU) and/or the vehicle 145-2, therefore, may communicate with the UE 105 and may be used to determine the position of the UE 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the UE 105, according to some embodiments.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of a mobile device 145 (e.g., another UE) at some known previous time). A location may be specified as a geodetic location comprising coordinates which may be absolute (e.g., latitude, longitude and optionally altitude), relative (e.g., relative to some known absolute location) or local (e.g., X, Y and optionally Z coordinates according to a coordinate system defined relative to a local area such a factory, warehouse, college campus, shopping mall, sports stadium or convention center). A location may instead be a civic location and may then comprise one or more of a street address (e.g., including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
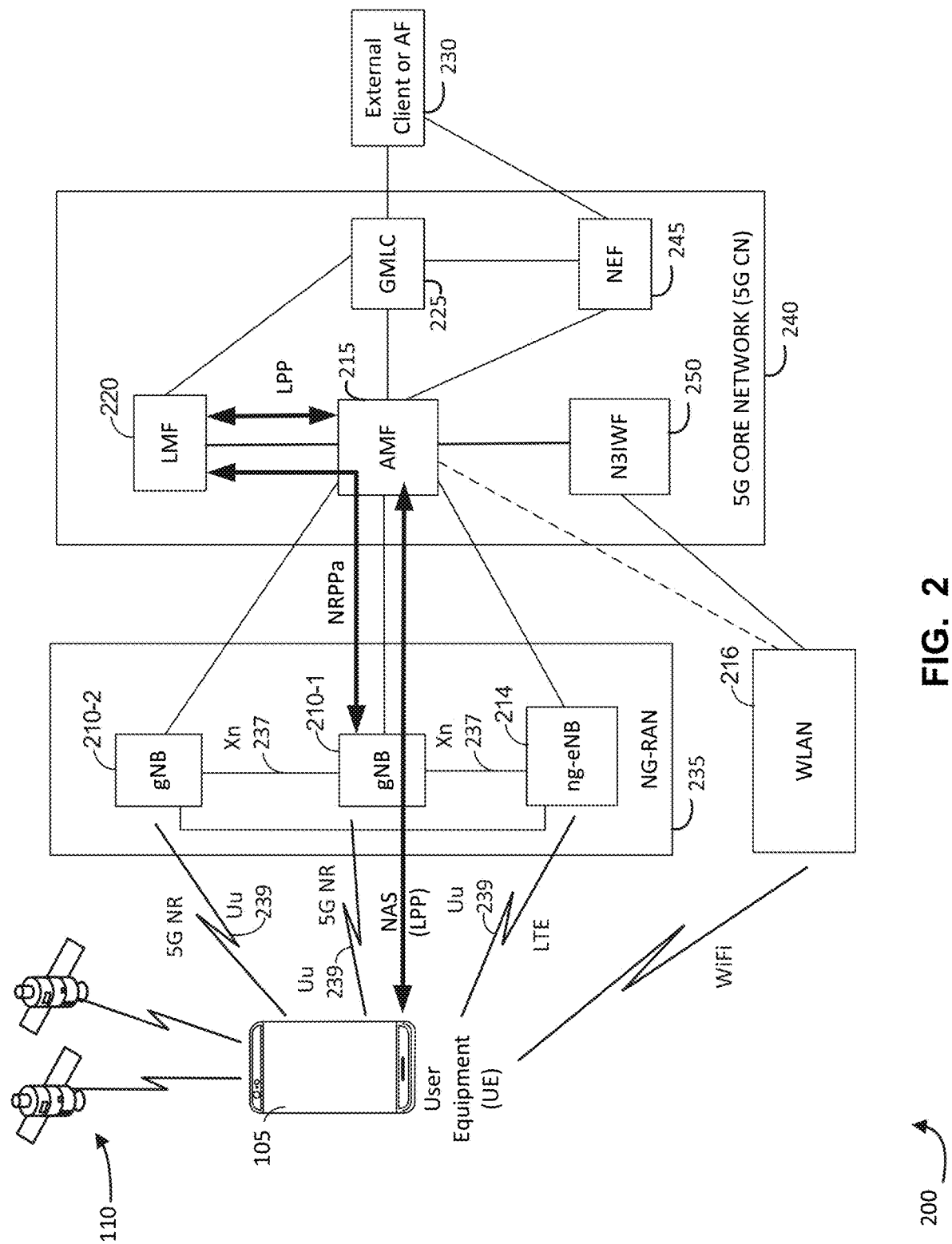
FIG. 2 is a diagram of a 5th Generation (5G) New Radio (NR) positioning system, illustrating an embodiment of a positioning system (e.g., the positioning system of FIG. 1) implemented within a 5G NR communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes, which may include NR NodeB (gNB) 210-1 and 210-2 (collectively and generically referred to herein as gNBs 210), ng-eNB 214, and/or WLAN 216 to implement one or more positioning methods. The gNBs 210 and/or the ng-eNB 214 may correspond with base stations 120 of FIG. 1, and the WLAN 216 may correspond with one or more access points 130 of FIG. 1. Optionally, the 5G NR positioning system 200 additionally may be configured to determine the location of a UE 105 by using an LMF 220 (which may correspond with location server 160) to implement the one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network.

The 5G NR positioning system 200 may further utilize information from satellites 110. As previously indicated, satellites 110 may comprise GNSS satellites from a GNSS system like Global Positioning System (GPS) or similar system (e.g., GLONASS, Galileo, Beidou, Indian Regional Navigational Satellite System (IRNSS)). Additionally or alternatively, satellites 110 may comprise NTN satellites that may be communicatively coupled with the LMF 220 and may operatively function as a TRP (or TP) in the NG-RAN 235. As such, satellites 110 may be in communication with one or more gNB 210.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of satellites 110, gNBs 210, ng-eNB s 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 105. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. As noted, this can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNB s supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node (e.g., gNB 210, ng-eNB 214, or WLAN 216) of a first RAT to an access node of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Frequency Difference Of Arrival (FDOA), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3:
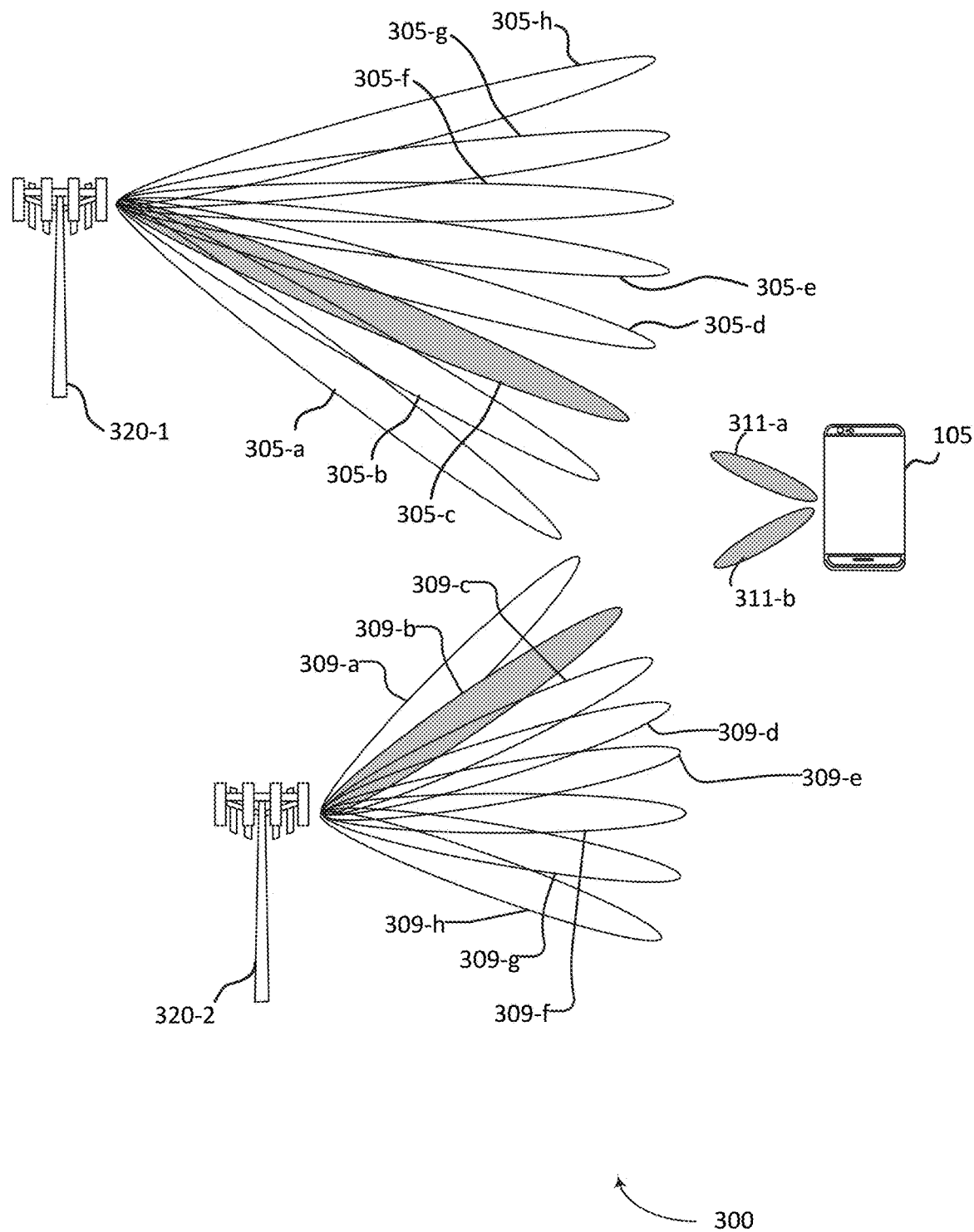
FIG. 3 is a diagram illustrating beamforming in a 5G NR positioning system.

FIG. 3 is a diagram illustrating a simplified environment 300 including two TRPs 320-1 and 320-2 (which may correspond to base stations 120 of FIG. 1 and/or gNB s 210 and/or ng-eNB 214 of FIG. 2) with antenna arrays that can perform beamforming to produce directional beams for transmitting and/or receiving reference signals. FIG. 3 also illustrates a UE 105, which may also use beamforming for transmitting and/or receiving reference signals. Such directional beams are used in 5G NR wireless communication networks. Each directional beam may have a beam width centered in a different direction, enabling different beams of a TRP 320 to correspond with different areas within a coverage area for TRP 320.

Different modes of operation may enable TRPs 320-1 and 320-2 to use a larger or smaller number of beams. For example, in a first mode of operation, a TRP 320 may use 16 beams, in which case each beam may have a relatively wide beam width. In a second mode of operation, a TRP 320 may use 64 beams, in which case each beam may have a relatively narrow beam width. Depending on the capabilities of a TRP 320, the TRP may use any number of beams TRP 320 may be capable of forming. The modes of operation and/or number of beams may be defined in relevant wireless standards and may correspond to different directions in either or both azimuth and elevation (e.g., horizontal and vertical directions). Different modes of operation may be used to transmit and/or receive different signal types. Additionally or alternatively, UE 105 may be capable of using different numbers of beams, which may also correspond to different modes of operation, signal types, etc.

In some situations, a TRP 320 may use beam sweeping. Beam sweeping is a process in which TRP 320 may send an RF signal in different directions using different respective beams, often in succession, effectively "sweeping" across a coverage area. For example, a TRP 320 may sweep across 120 or 360 degrees in an azimuth direction, for each beam sweep, which may be periodically repeated. Each direction beam can include an RF reference signal (e.g., a PRS resource), where base station 120-1 produces a set of RF reference signals that includes Tx beams 305-a, 305-b, 305-c, 305-d, 305-e, 305-f, 305-g, and 305-h, and the base station 120-2 produces a set of RF reference signals that includes Tx beams 309-a, 309-b, 309-c, 309-d, 309-e, 309-f, 309-g, and 309-h. As noted, because UE 105 may also include an antenna array, it can receive RF reference signals transmitted by base stations 120-1 and 120-2 using beamforming to form respective receive beams (Rx beams) 311-a and 311-b. Beamforming in this manner (by base stations 120 and optionally by UEs 105) can be used to make communications more efficient. They can also be used for other purposes, including taking measurements for position determination (e.g., AoD and AoA measurements).

Figure 4:
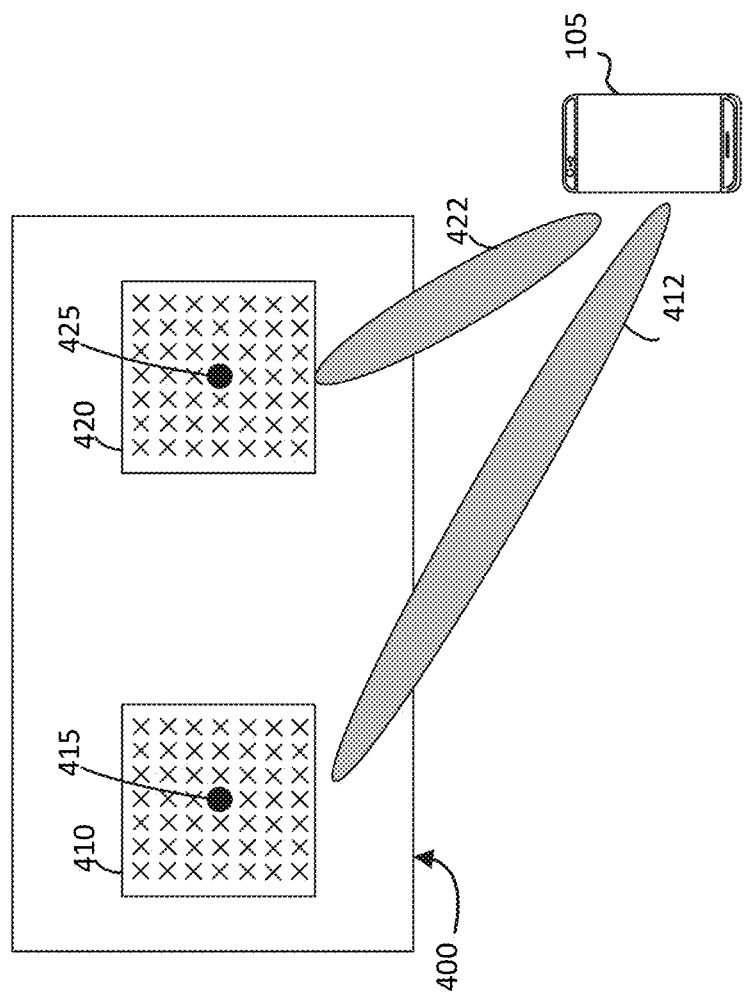
FIG. 4 is a diagram illustrating simplified TRP panels including a TRP transmission panel and the TRP reception panel with antenna arrays that can perform reference signals transmission and/or reception.

As noted above, in many wireless communication implementations, the TRP transmission panel and the TRP reception panel are separated for desired positioning performance. For example, FIG. 4 is a diagram illustrating simplified TRP panels 400 including a TRP transmission panel 410 and a TRP reception panel 420 (which may correspond to base stations 120 of FIG. 1, gNBs 210 and/or ng-eNB 214 of FIG. 2, and/or TRP 320 of FIG. 3) with antenna arrays that can perform reference signals transmission and/or reception. FIG. 4 also illustrates a UE 105, which may also perform reference signals transmission and/or reception. Such different panels for reference signal transmission and reception (e.g., the transmission of the downlink (DL) PRSs 412 and the reception of the uplink (UL) SRSs 422) may be used in 5G NR wireless communication networks (e.g., in SBFD systems or full-duplex systems). Each TRP panel of the TRP transmission panel 410 and the TRP reception panel 420 may have different ARP representing the location of the corresponding TRP panel.

For example, as illustrated in FIG. 4, TRP transmission panel 410 may have a PRS-ARP 415 (also referred as "DL-PRS resource reference point") representing the location of the antenna array for transmitting the PRS reference signals. TRP reception panel 420 may have an SRS-ARP 425 (also referred as "UL-SRS resource reference point") representing the location of the antenna array for receiving the PRS reference signals. The PRS-ARP 415 and the SRS-ARP 425 are at different locations (e.g., having a translation offset and/or a rotation offset (not shown)).

In many existing positioning schemes (e.g., multi-RTT positioning, UL-TDOA positioning, and UL-AoA positioning), the coordinate of the PRS-ARP 415 is reported by a base station (e.g., base stations 120 of FIG. 1, gNBs 210 and/or ng-eNB 214 of FIG. 2) to a LMF (e.g., LMF 220 of FIG. 2) in assistance data. For example, besides other information (e.g., timing information of the TRPs served by the base station, DL-PRS configuration of the TRPs served by the base station, SSB information of the TRPs), the assistance data transmitted from the base station to the LMF may also include spatial direction information of the DL-PRS resources of the TRPs served by the base station and/or geographical coordinates information of the DL-PRS resources of the TRPs served by the base station. However, the location/coordinate of the of ARP of UL-SRS resources (e.g., SRS-ARP 425) are not reported (e.g., are assumed to be the same as the coordinate of the PRS-ARP) in most of those positioning schemes. As noted above, not knowing the coordinate/location of the ARP of UL SRS resources may negatively impact the accuracy of the positioning. As will be described in detail below, the technique disclosed herein defines and reports the coordinate/location of the ARP of UL-SRS resources for accurately positioning of UEs.

Figure 5:
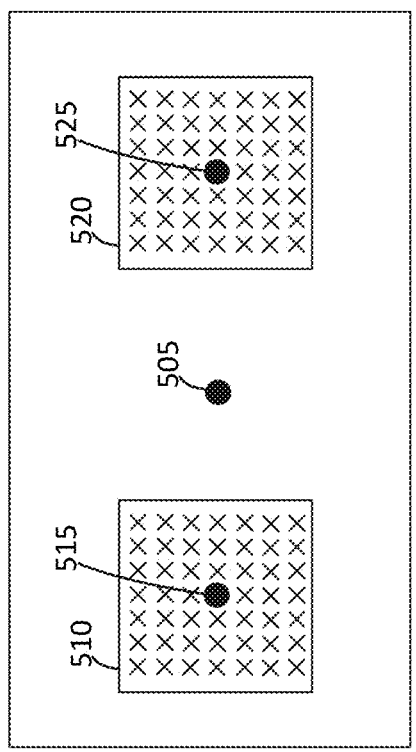
FIG. 5 is a diagram illustrating how antenna reference points (ARPs) of a TRP transmission panel and a TRP reception panel of a simplified TRP panel are defined, according to an embodiment.

In some embodiments, the location of the ARP of UL-SRS resources may be defined according to a common reference point shared with the ARP of the DL-PRS. For example, as illustrated in FIG. 5, the TRP panels 500 may include a TRP transmission panel 510 and a TRP reception panel 520 (which may correspond to base stations 120 of FIG. 1, gNBs 210 and/or ng-eNB 214 of FIG. 2, TRP 320 of FIG. 3, and/or TRP panels 400 in FIG. 4), PRS-ARP 515 and SRS-ARP 525 for representing the location of TRP transmission panel 510 and the TRP reception panel 520 respectively, and a common reference point 505 of TRP panels 500 defined for reporting the location of both PRS-ARP 515 and SRS-ARP 525.

Figure 6A:
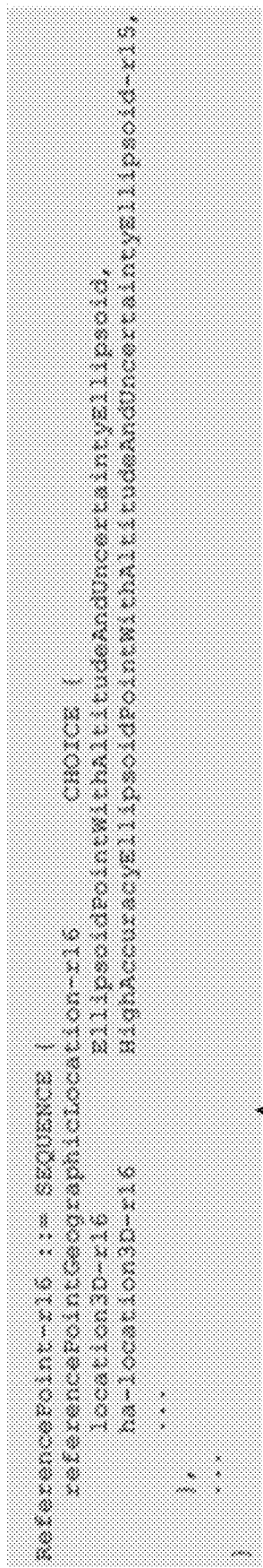
FIGS. 6A and 6B are examples of assistance data indicating a common reference point location and an ARP relative location with regard to the common reference point, according to an embodiment.
Figure 6B:
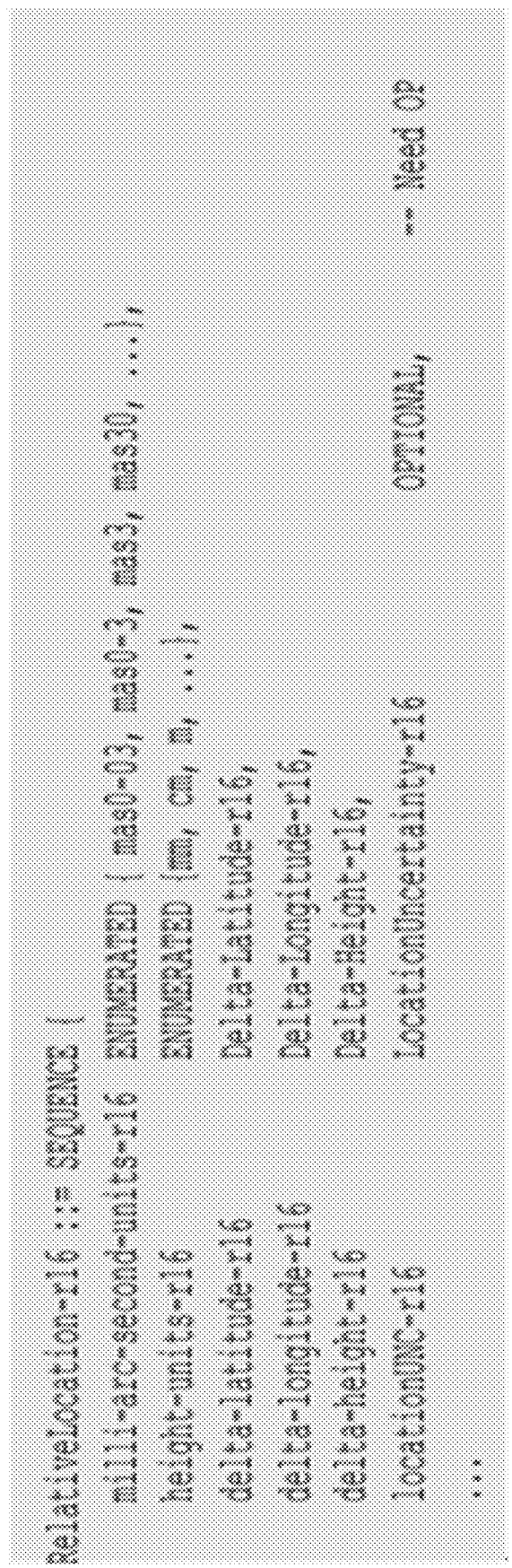

In some embodiments, the common reference point 505 may be defined as the center of the TRP panels 500 (e.g., the centroid of TRP panels 500), the middle point of the PRS-ARP 515 and the SRS-ARP 525, or any arbitrary point (e.g., outside of the TRP panels 500) for desired performance. Accordingly, the location of the PRS-ARP 515 and the SRS-ARP 525 may be defined as a relative location with respect to the common reference point. For example, FIGS. 6A and 6B are examples of assistance data indicating a common reference point location 610 (e.g., defining the location of common reference point 505) and an ARP relative location 620 with regard to the reference point. As illustrated in FIG. 6A, in some embodiments, the common reference point may be defined with e.g., latitude, longitude, and uncertainty values. As illustrated in FIG. 6A, in some embodiments, the relative location of the ARPs may be defined in measurements such as angle, height, longitude, latitude, uncertainty values, etc., with regard to the common reference point location 610.

It is contemplated that although only one ARP relative location (e.g., ARP relative location 620) is shown as indicated in the assistance data in FIG. 6B, for each TRP, every DL-PRS resources and UL-SRS resources of the TRP (e.g., TRP panels in FIG. 5) may be assigned a separate ARP relative location and be indicated in the assistance data transmitted by the base station (will be described in detail below).

Figure 7:
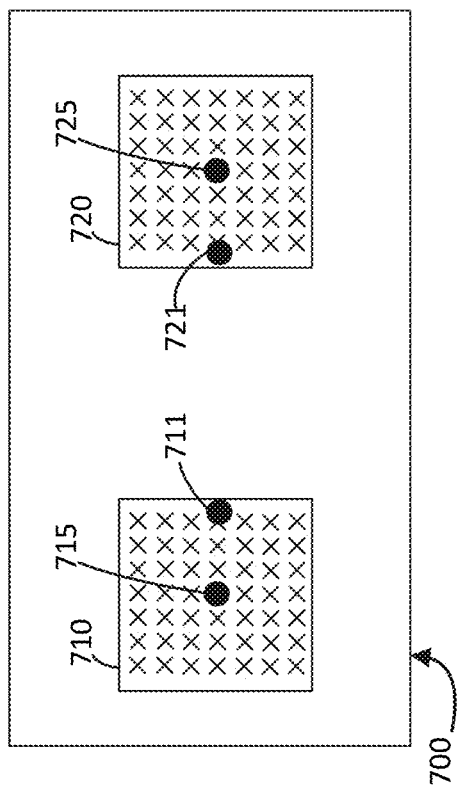
FIG. 7 is a diagram illustrating how ARPs of a TRP transmission panel and a TRP reception panel of a simplified TRP panel are defined, according to an embodiment.

In some embodiments, the ARP of DL-PRS resources and UL-SRS resources may be defined according to separate common reference points. For example, as illustrated in FIG. 7, TRP panels 700 (which may correspond to base stations 120 of FIG. 1, gNBs 210 and/or ng-eNB 214 of FIG. 2, TRP 320 of FIG. 3, and/or TRP panels 400 in FIG. 4) may include a DL resources common reference point 711 for defining the location of the ARP of DL-PRS resources 710 and a UL resources common reference point 721 for defining the location of the ARP of UL-SRS resources 720. The location of the PRS-ARP 715 and the SRS-ARP 725 may be defined as a relative location with respect to the DL resources common reference point 711 and the UL resources common reference point 721 respectively, similar to defining the relative location with regard to the common reference point location 610 and the ARP relative location 620 with regard to the reference point shown in FIG. 6.

In some embodiments, the location of UL resources common reference point 721 and the location of DL resources common reference point 711 may be defined separately by having different coordinates. Additionally or alternatively, in some embodiments, UL resources common reference point 721 may be defined as a relative location with regard to the DL resources common reference point 711, similar to defining the common reference point location 610 and the ARP relative location 620 as shown in FIG. 6, or vice versa. In some embodiments, if one of the DL resources common reference point 711 or the UL resources common reference point 721 is not defined or not reported in the assistance data, a default common reference point may be assumed. For example, if only the DL resources common reference point 711 is defined and the UL resources common reference point 721 is not, the UL resources common reference point 721 may be assumed to be the same as the DL resources common reference point 711. Accordingly, the location of the SRS-ARP 725 may be defined as a relative location with regard to the assumed DL resources common reference point, similar to the scheme described with regard to FIG. 5.

In some embodiments, in addition to the angle, the height, the longitude, the latitude, etc., the relative location may also include defining/specifying a translation offset, a rotation offset, or any combination thereof with respect to the corresponding common reference point.

As noted above, the defined location information of the PRS-ARP and the SRS-ARP (e.g., the PRS-ARP 515 and the SRS-ARP 525 in FIG. 5, and the PRS-ARP 715 and the SRS-ARP 725 in FIG. 7) may be reported in assistance data by the base station to different devices (e.g., a UE and/or a location server) in different positioning schemes. It is noted that, although both location information of the PRS-ARP and the SRS-ARP are defined, the location information of the PRS-ARP and the SRS-ARP (e.g., the PRS-ARP 515 and the SRS-ARP 525 in FIG. 5, and the PRS-ARP 715 and the SRS-ARP 725 in FIG. 7) may be independently transmitted (e.g., having defined locations different from each other). For example, in positioning schemes where only UL reference signal(s) are used, the location information of the SRS-ARP may be transmitted in the assistance data without referring to a location of the PRS-ARP.

Figure 8:
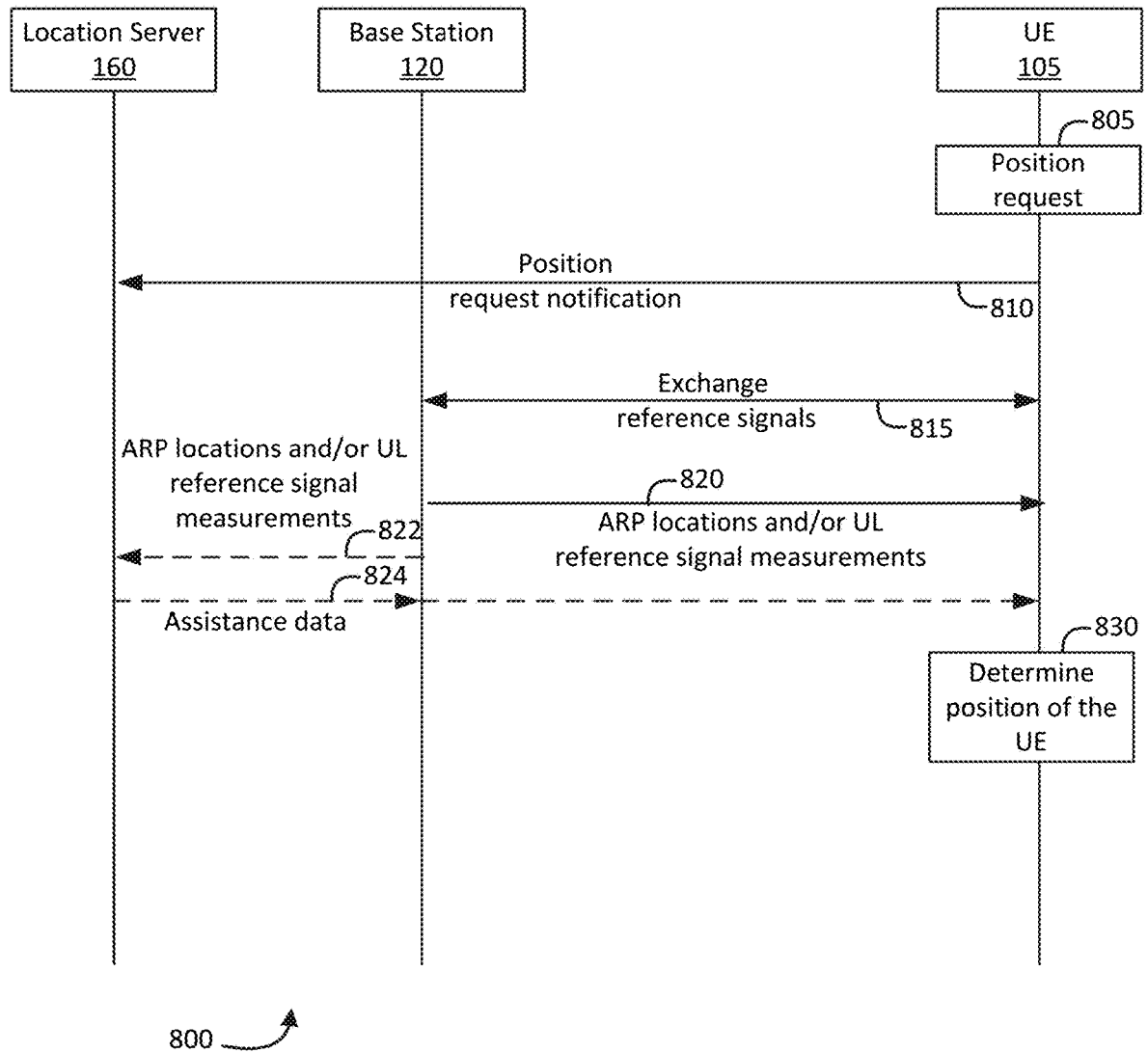
FIG. 8 is a call flow diagram of a UE-based processes of performing position determination of a target UE with reporting location(s) of ARP(s) of TRP(s) for receiving UL-SRS by a base station, according to an embodiment.

For example, FIG. 8 is a call flow diagram 800 of a UE-based (or UE-initiated) processes of performing position determination of a target UE (e.g., the UE 105) with reporting location(s) of ARP(s) of TRP(s) for receiving UL-SRS by a base station (e.g., base station 120), according to some embodiments. As with the other figures provided herein, FIG. 8 is provided as a nonlimiting example. It can be noted that arrows between the various components illustrated in FIG. 8 illustrate messages or information sent from one component to another.

At block 805, the process may begin with a position request generated, for example, from an application (or app) executed by the UE to determine a position or location of a target UE (e.g., UE 105). This may be a result from user interaction with the UE 105, based on a determined schedule, or based on other triggers (including user input). Additionally or alternatively, a position request may come from a separate device.

In response, the UE 105 may generate a position request notification. As indicated at arrow 810, the request can be sent to the location server 160, which can coordinate the transmission of the reference signals between the base station 120 and the UE 105. In DL-UL based positioning such as RTT-based positioning, DL-PRS and UL-SRS are both transmitted and received by the base station 120. In some embodiments, communication between the location server 160 and UE 105 may occur via an LPP positioning session.

At arrow 815, reference signals such as DL-PRS and/or UL-SRS may be communicated between base station 120 and UE 105 according to the location server 160's coordination (e.g., configuration information or assistance data provided by the location server 160). With regard to communication between the components illustrated in FIG. 8, it will be understood that there may be any number of intervening devices, servers, etc. that may relay such messages, including other components in FIG. 8. (E.g., a message from the UE 105 to the location server 160 may pass through the base station 120, which may be the serving base station for the UE 105.)

At arrow 820, the location information of TRPs configured for transmitting and/or receiving reference signals (e.g., the location of the PRS-ARP 515 and the SRS-ARP 525 in FIG. 5, and/or the location of the PRS-ARP 715 and the SRS-ARP 725 in FIG. 7) and/or measurement(s) determined based on the reference signals (e.g., measurements determined by the base station 120 based on the UL reference signal) may be transmitted from the base station 120 to the UE 105 for determining the location of the target UE, (e.g., indicated in assistance data transmitted from the base station 120 to the UE 105). The location information of the ARPs may be defined in a manner as noted above (e.g., with regard to FIGS. 5, 6, and 7). In some embodiments, the based station 120 may transmit the ARP location information and/or the UL reference signal measurement(s) directly to the UE 105. Additionally or alternatively, in some embodiments, the based station 120 may relay the ARP location information and/or the UL reference signal measurement(s) to the UE 105 through the location server 160. For example, as illustrated in dash lines 822 and 824, the base station 120 may transmit the ARP location information and/or the UL reference signal measurement(s) to location server 160 (e.g., indicated in assistance data transmitted from the base station 120 to the location server 160) and location server 160 may transmit the ARP location information and/or the UL reference signal measurement(s) to the UE 105 through assistance data (e.g., include the ARP location information and/or the UL reference signal measurement(s) in the assistance data transmitted to the UE 105).

It is understood that although as illustrated in FIG. 8, the ARP location information and the UL reference signal measurement(s) are transmitted at a same time (e.g., indicated in the same assistance data), the ARP location information and the UL reference signal measurement(s) may be transmitted separately at different time points. For example, the ARP location information may be transmitted ahead of time before exchanging the reference signals at arrow 815.

At block 830, the UE 105 may determine the location of the target UE based on the reference signals and the assistance data. For example, the UE 105 may determine location measurements such as one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, etc. based on the reference signals and the location information of the ARPs. The UE 105 may determine a location estimate for the target UE based on the one or more location measurements.

Figure 9:
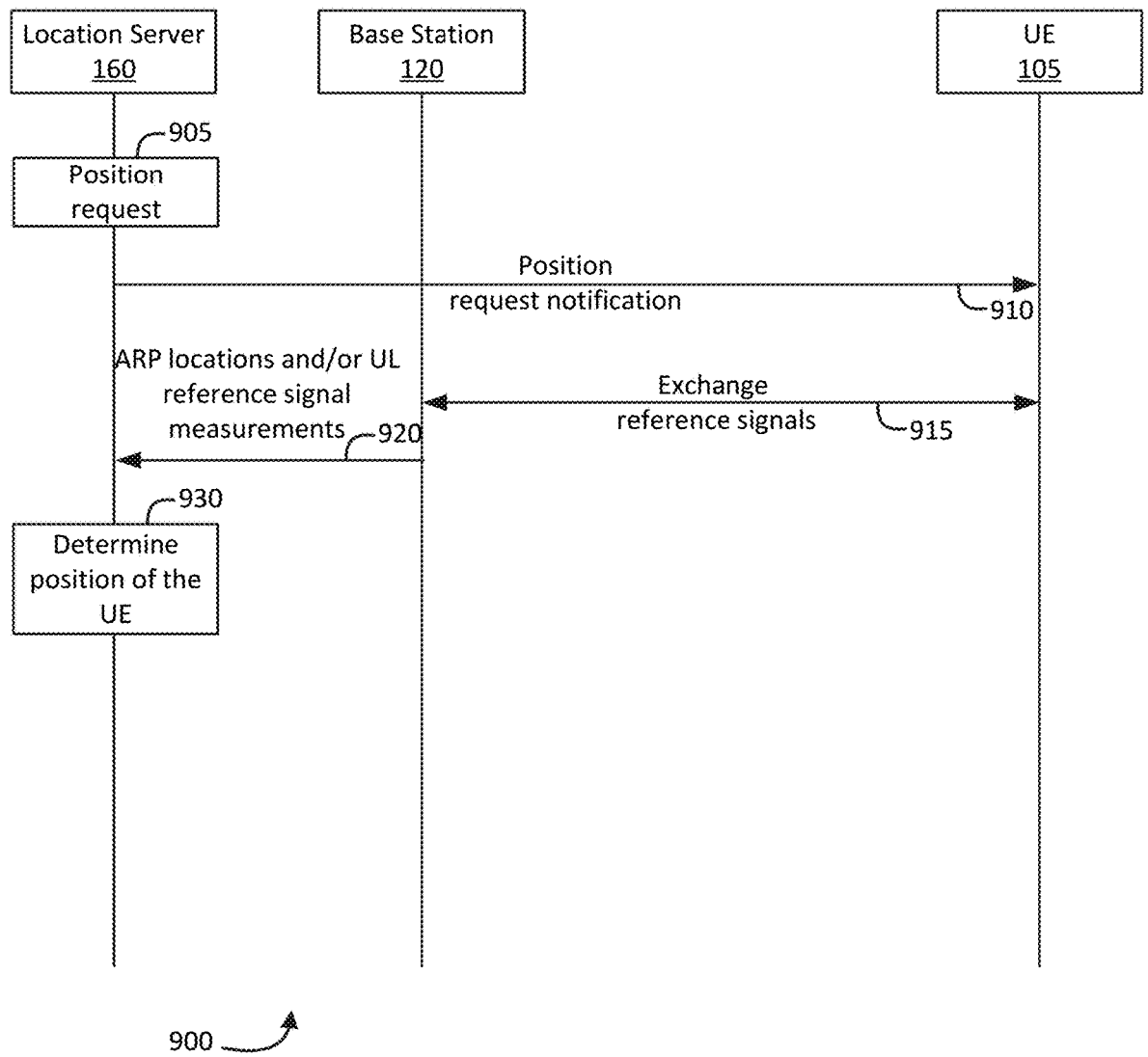
FIG. 9 is a call flow diagram of a UE-assisted processes of performing position determination of a target UE with reporting location(s) of ARP(s) of TRP(s) for receiving UL-SRS by a base station, according to an embodiment.

For another example, FIG. 9 is a call flow diagram 900 of a UE-assisted (or network-initiated) processes of performing position determination of a target UE (e.g., the UE 105) with reporting of location(s) of ARP(s) of TRP(s) for receiving UL-SRS, according to some embodiments. As with the other figures provided herein, FIG. 9 is provided as a nonlimiting example. It can be noted that arrows between the various components illustrated in FIG. 9 illustrate messages or information sent from one component to another.

This process may begin with a position request obtained at the location server 160, as indicated at block 905. As indicated previously, UE-assisted (or network-based) positioning can be based on a request from an external client (e.g., external client 180 of FIG. 1 and/or external client 230 of FIG. 2). Additionally or alternatively, the request may come from a service within the wireless network that may need the position of a target UE (e.g., the UE 105) to provide particular functionality.

In response to the position request, the location server 160 may notify the UE 105 of the position request via position request notification, as indicated at arrow 910. In some embodiments, this may comprise initiating a communication session between the location server 160 and the UE 105. Among other things, this position request notification at arrow 910 may put the UE 105 on notice, preparing the UE 105 to subsequently take location measurements of one or more reference signals (e.g., DL-PRS and UL-SRS) transmitted between the base station 120 and the UE 105.

Similar to the process illustrated in FIG. 8, reference signals such as DL-PRS and/or UL-SRS may be communicated between base station 120 and UE 105 according to the location server 160's coordination at arrow 915. At arrow 920, the location information of ARPs configured for transmitting and/or receiving reference signals (e.g., the location of the PRS-ARP 515 and the SRS-ARP 525 in FIG. 5, and/or the location of the PRS-ARP 715 and the SRS-ARP 725 in FIG. 7), and/or the UL reference signal measurement(s) (e.g., measurements determined by the base station 120 based on the UL reference signal) may be transmitted from the base station 120 to the location server 160 for determining the location of the target UE. The location information and/or the UL reference signal measurement(s) may be indicated in assistance data transmitted from the base station 120 to the location server 160. The location information of ARPs may be defined in a manner as noted above (e.g., with regard to FIGS. 5, 6, and 7). In some embodiments, DL-PRS measurement(s) (e.g., measurements determined by the UE 105 based on the DL reference signal) may also be transmitted to the location server 160 for determining the location of the target UE.

It is understood that although as illustrated in FIG. 9, the ARP location information and the UL reference signal measurement(s) are transmitted at a same time (e.g., indicated in the same assistance data), the ARP location information and the UL reference signal measurement(s) may be transmitted separately at different time points. For example, the ARP location information may be transmitted ahead of time before exchanging the reference signals at arrow 915.

At block 930, the location server 160 may determine the position of the target UE based on the reference signals and the assistance data. For example, the location server 160 may determine location measurements such as one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, etc. based on the reference signals and the location information of ARPs. The location server 160 may determine a location estimate for the target UE based on the one or more location measurements.

Figure 10:
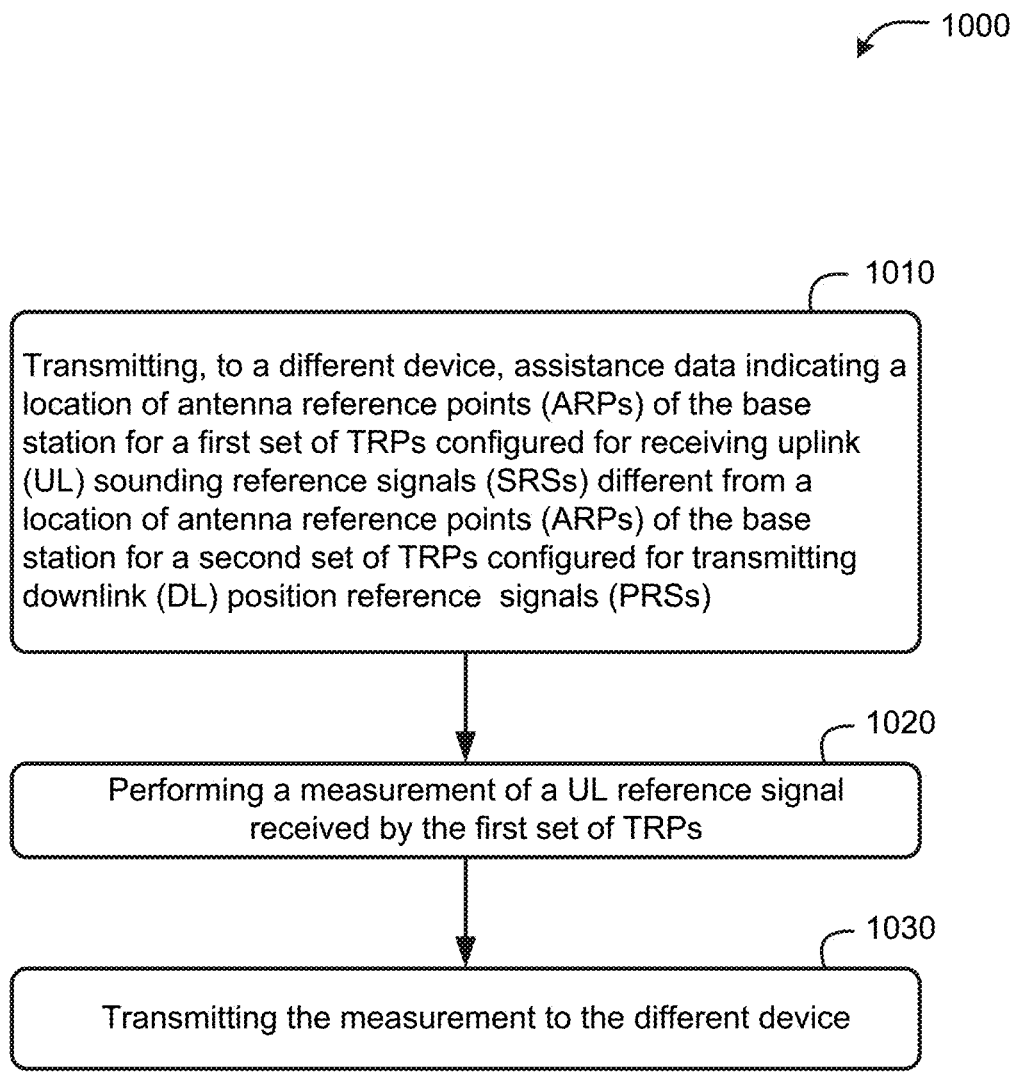
FIG. 10 is a flow diagram of a method of wireless communication at a base station for positioning a UE with reporting location(s) of ARP(s) of TRP(s) for receiving UL-SRS by the base station, according to an embodiment.
Figure 12:
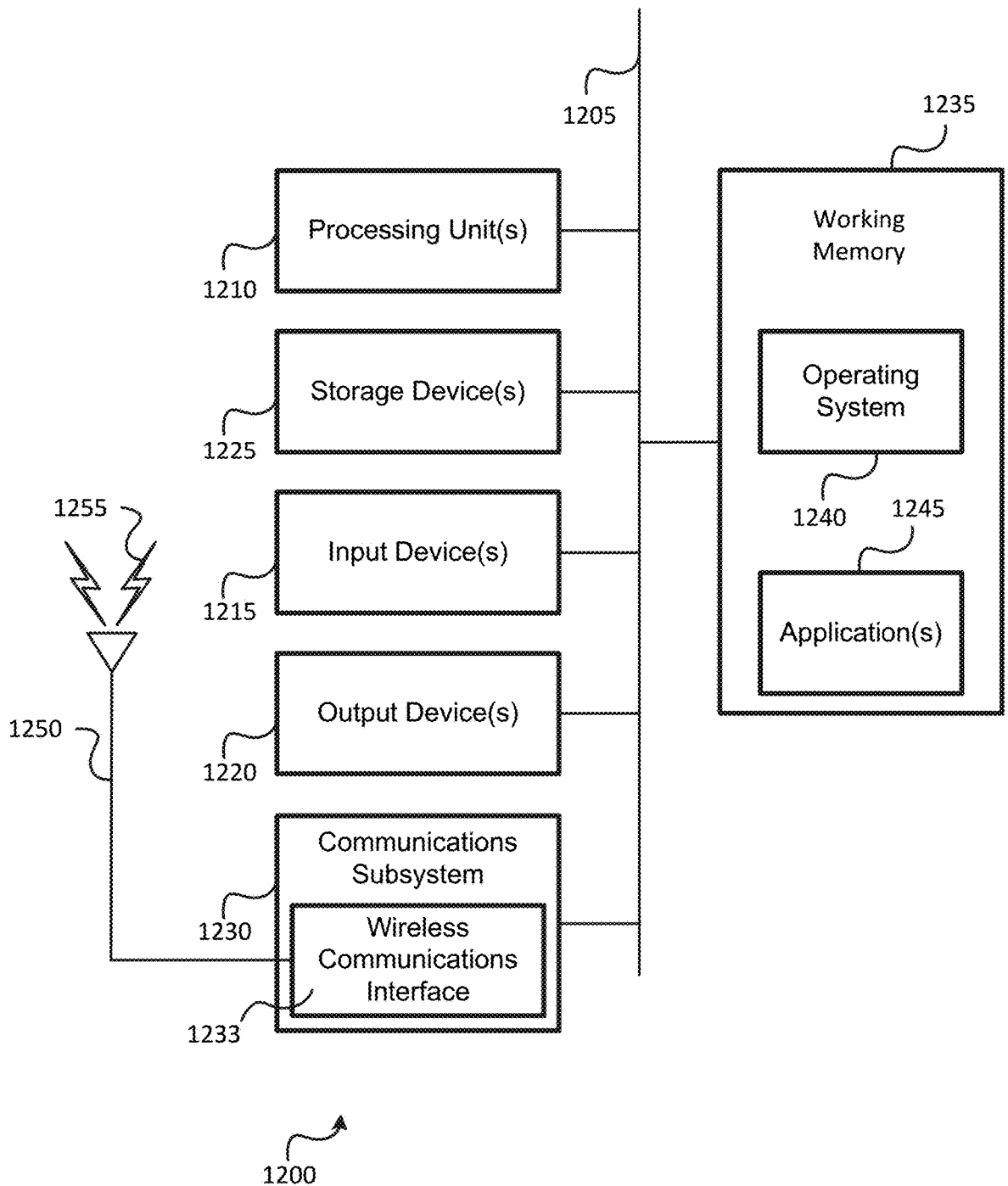
FIG. 12 is a block diagram of an embodiment of a computer system.

FIG. 10 is a flow diagram of a method 1000 of wireless communication at a base station for positioning a target UE with reporting location(s) of ARP(s) of TRP(s) for receiving UL-SRS by the base station, according to an embodiment. The method 1000 provides for reporting of location(s) of ARP(s) of TRP(s) for receiving UL-SRS(s) in the manner indicated in the previously-described embodiments. Means for performing the functionality illustrated in the blocks shown in FIG. 10 may be performed by hardware and/or software components of a base station. Example components of a base station are illustrated in FIG. 12, which are described in more detail below. It is understood that not all functionalities of the blocks shown in FIG. 10 are necessary and the functionalities of the blocks shown in FIG. 10 may be performed in orders different from that shown in FIG. 10.

In some implementations, at block 1010, the functionality comprises transmitting, to a different device (e.g., the location server 160 and/or the UE 105), assistance data indicating a location of antenna reference points (ARPs) of the base station for a first set of TRPs configured for receiving uplink (UL) sounding reference signals (SRSs) different from a location of antenna reference points (ARPs) of the base station for a second set of TRPs configured for transmitting downlink (DL) position reference signals (PRSs).

As noted above, in some embodiments, the SRS-ARPs may be defined according to a common reference point shared by the PRS-ARPs and the SRS-ARPs, and the location of the PRS-ARP and the SRS-ARP may be defined as relative locations and/or offsets with respect to the common reference point as described with regard to FIGS. 5 and 6.

Additionally or alternatively, in some embodiments, the SRS-ARPs may be defined according to separate common reference points corresponding to the PRS-ARPs and SRS-ARPs respectively, and the location of the PRS-ARP and the SRS-ARP may be defined as relative locations and/or offsets with respect to the common reference point as described with regard to FIGS. 6 and 7.

It is understood that although both the PRS-ARPs and the SRS-ARPs may be defined in the technical solution disclosed herein, in some implementations where SRS(s) are transmitted independent of the transmission of the PRS(s) (e.g., without the transmission of the PRS(s)), the location of the SRS-ARPs may be transmitted without referring to the location of the PRS-ARPs.

Means for performing functionality at block 1010 may comprise a bus 1205, processor(s) 1210, input devices 1215, communications subsystem 1230 (wireless communications interface 1233), work memory 1235, and/or other components of a computer system 1200, as illustrated in FIG. 12.

The functionality at block 1020 comprises performing, a measurement of a UL reference signal (e.g., an SRS) received by the first set of TRPs. Means for performing functionality at block 1020 may comprise a bus 1205, processor(s) 1210, input devices 1215, communications subsystem 1230 (wireless communications interface 1233), work memory 1235, and/or other components of a computer system 1200, as illustrated in FIG. 12.

The functionality at block 1030 comprises transmitting the measurement to the different device. As previously indicated, the different device may comprise a location server (e.g., the location server 160) or a UE (e.g., the UE 105). Means for performing functionality at block 1030 may comprise a bus 1205, processor(s) 1210, input devices 1215, communications subsystem 1230 (wireless communications interface 1233), work memory 1235, and/or other components of a computer system 1200, as illustrated in FIG. 12.

Figure 11:
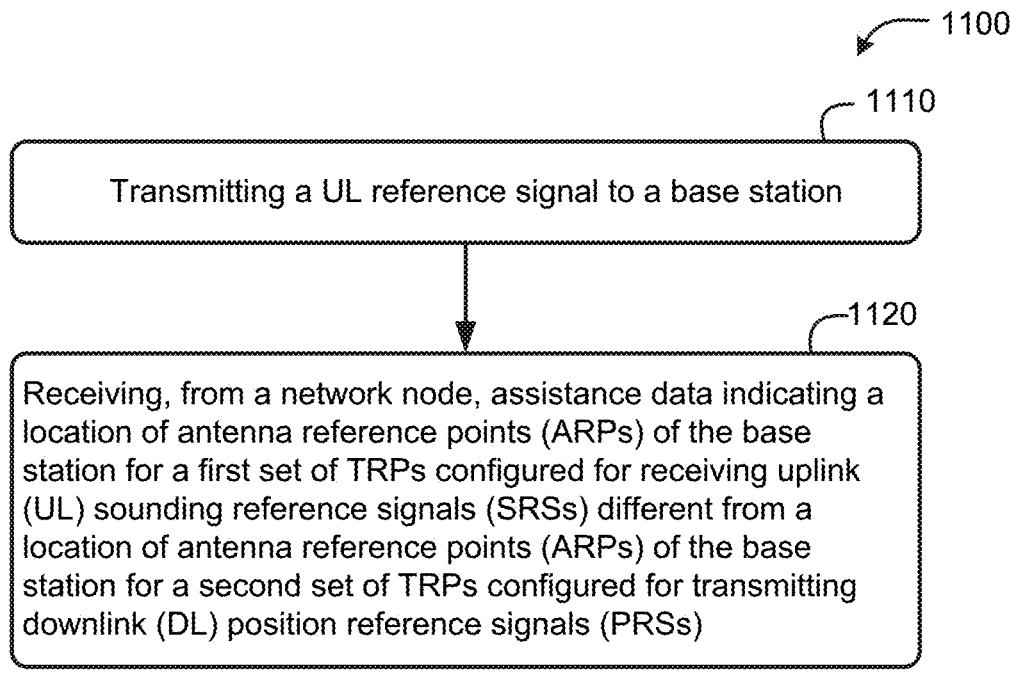
FIG. 11 is a flow diagram of a method of wireless communication at a UE for positioning a target UE with reporting location(s) of ARP(s) of TRP(s) for receiving UL-SRS by a base station, according to an embodiment.
Figure 13:
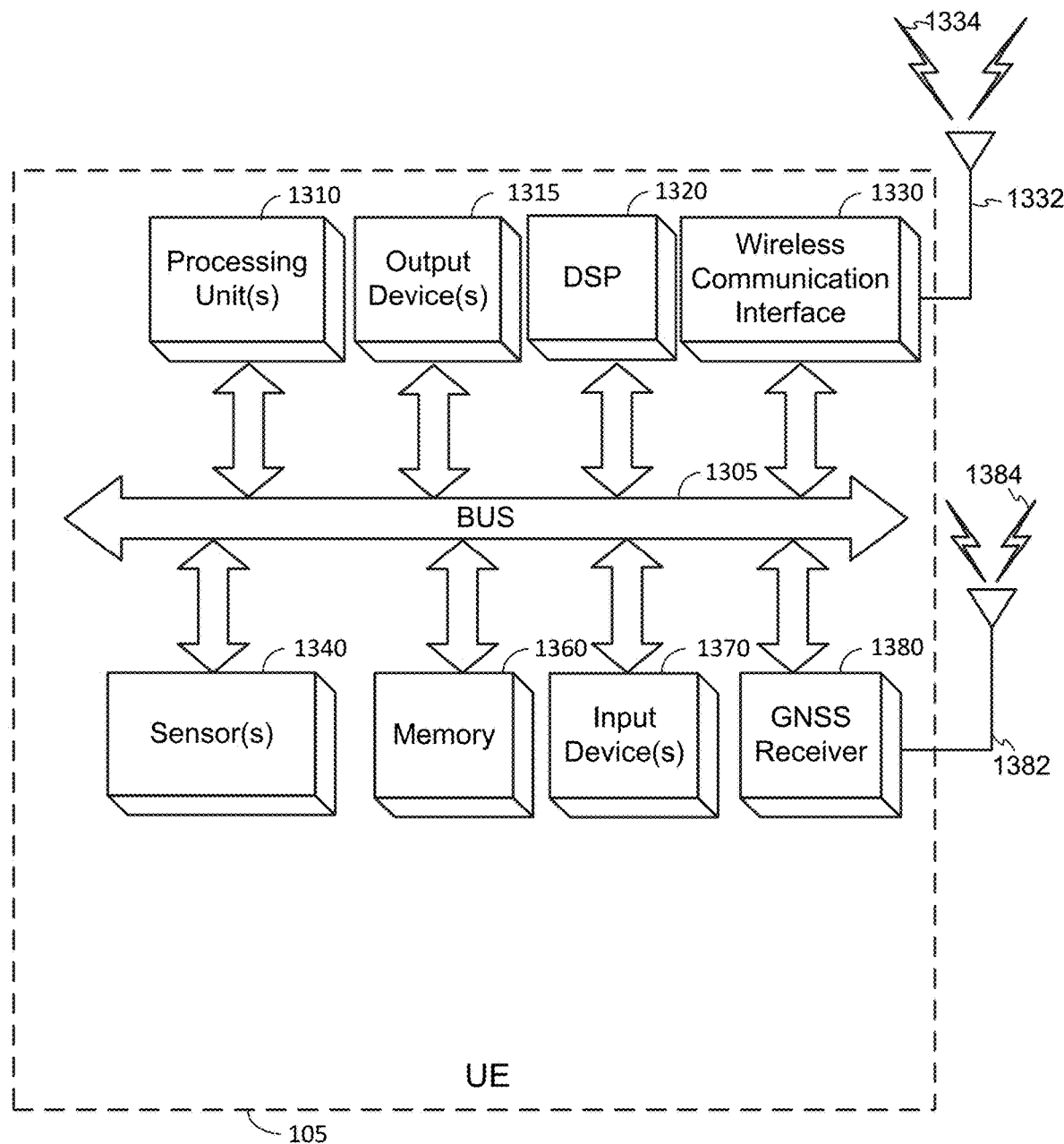
FIG. 13 is a block diagram of a UE, according to an embodiment.

FIG. 11 is a flow diagram of a method 1100 of wireless communication at a UE for positioning a target UE, according to an embodiment. Means for performing the functionality illustrated in the blocks shown in FIG. 13 may be performed by hardware and/or software components of a UE (e.g., the UE 105). Example components of a UE are illustrated in FIG. 13, which are described in more detail below. It is understood that not all functionalities of the blocks shown in FIG. 11 are necessary and the functionalities of the blocks shown in FIG. 11 may be performed in orders different from that shown in FIG. 11.

The functionality at block 1110 comprises, transmitting a UL reference signal (e.g., an SRS) to a base station (e.g., the base station 120). Means for performing functionality at block 1110 may comprise a wireless communication interface 1330, bus 1305, digital signal processor (DSP) 1320, processing unit(s) 1310, memory 1360, and/or other components of a UE 105, as illustrated in 13.

In some implementations, the functionality at block 1120 comprises, receiving, from a network node, assistance data assistance data indicating a location of antenna reference points (ARPs) of the base station for a first set of TRPs configured for receiving uplink (UL) sounding reference signals (SRSs) different from a location of antenna reference points (ARPs) of the base station for a second set of TRPs configured for transmitting downlink (DL) position reference signals (PRSs). As previously indicated, the network node may comprise a location server (e.g., the location server 160) or a base station. The assistance data may further include a measurement of the UL reference signal determined by the base station (e.g., the base station 120).

As noted above, in some embodiments, the SRS-ARPs may be defined according to a common reference point shared by the PRS-ARPs and SRS-ARPs, and the location of the PRS-ARP and the SRS-ARP may be defined as a relative location and/or an offset with respect to the common reference point as described with regard to FIGS. 5 and 6.

In some embodiments, the PRS-ARPs and SRS-ARPs may be defined according to separate common reference points corresponding to the PRS-ARPs and SRS-ARPs respectively, and the location of the PRS-ARP and the SRS-ARP may be defined as relative locations and/or offsets with respect to the common reference point as described with regard to FIGS. 6 and 7.

It is understood that although both the PRS-ARPs and the SRS-ARPs may be defined in the technical solution disclosed herein, in some implementations where SRS(s) are transmitted independent of the transmission of the PRS(s) (e.g., without the transmission of the PRS(s)), the location of the SRS-ARPs may be transmitted without referring to the location of the PRS-ARPs.

Means for performing functionality at block 1120 may comprise a wireless communication interface 1330, bus 1305, digital signal processor (DSP) 1320, processing unit (s) 1310, memory 1360, and/or other components of a UE 105, as illustrated in 13.

FIG. 12 is a block diagram of an embodiment of a computer system 1200, which may be used, in whole or in part, to provide the functions of one or more network components as described in the embodiments herein (e.g., base station 120 and location server 160 of FIG. 1, LMF 220 of FIG. 2, etc.). It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner. In addition, it can be noted that components illustrated by FIG. 12 can be localized to a single device and/or distributed among various networked devices, which may be disposed at different geographical locations.

The computer system 1200 is shown comprising hardware elements that can be electrically coupled via a bus 1205 (or may otherwise be in communication, as appropriate). The hardware elements may include processing unit(s) 1210, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1200 also may comprise one or more input devices 1215, which may comprise without limitation a mouse, a keyboard, a camera, a microphone, and/or the like; and one or more output devices 1220, which may comprise without limitation a display device, a printer, and/or the like.

The computer system 1200 may further include (and/or be in communication with) one or more non-transitory storage devices 1225, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1200 may also include a communications subsystem 1230, which may comprise wireless communication technologies managed and controlled by a wireless communication interface 1233, as well as wired technologies (such as Ethernet, coaxial communications, universal serial bus (USB), and the like). The wireless communication interface 1233 may send and receive wireless signals 1255 (e.g., signals according to 5G NR or LTE) via wireless antenna(s) 1250. Thus the communications subsystem 1230 may comprise a modem, a network card (wireless or wired), an infrared communication device, a wireless communication device, and/or a chipset, and/or the like, which may enable the computer system 1200 to communicate on any or all of the communication networks described herein to any device on the respective network, including a User Equipment (UE), base stations and/or other TRPs, and/or any other electronic devices described herein. Hence, the communications subsystem 1230 may be used to receive and send data as described in the embodiments herein.

In many embodiments, the computer system 1200 will further comprise a working memory 1235, which may comprise a RAM or ROM device, as described above. Software elements, shown as being located within the working memory 1235, may comprise an operating system 1240, device drivers, executable libraries, and/or other code, such as one or more applications 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as an optical disc), and/or provided in an installation package, such that the storage medium can be used to program, configure, and/or adapt a general-purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

FIG. 13 illustrates an embodiment of a UE 105, which can be utilized as described herein above (e.g., in association with FIGS. 1-11). For example, the UE 105 can perform one or more of the functions of the method shown in FIG. 11. It should be noted that FIG. 13 is meant only to provide a generalized illustration of various components, any or all of which may be utilized as appropriate. It can be noted that, in some instances, components illustrated by FIG. 13 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 13.

The UE 105 is shown comprising hardware elements that can be electrically coupled via a bus 1305 (or may otherwise be in communication, as appropriate). The hardware elements may include a processing unit(s) 1310 which can include without limitation one or more general-purpose processors, one or more special-purpose processors (such as DSP chips, graphics acceleration processors, application specific integrated circuits (ASICs), and/or the like), and/or other processing structures or means. As shown in FIG. 13, some embodiments may have a separate DSP 1320, depending on desired functionality. Location determination and/or other determinations based on wireless communication may be provided in the processing unit(s) 1310 and/or wireless communication interface 1330 (discussed below). The UE 105 also can include one or more input devices 1370, which can include without limitation one or more keyboards, touch screens, touch pads, microphones, buttons, dials, switches, and/or the like; and one or more output devices 1315, which can include without limitation one or more displays (e.g., touch screens), light emitting diodes (LEDs), speakers, and/or the like.

The UE 105 may also include a wireless communication interface 1330, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. As such, the wireless communication interface 1330 can include RF circuitry capable of being tuned between an active BWP and one or additional bands having one or more FLs used for PRS signals, as described herein. The wireless communication interface 1330 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1332 that send and/or receive wireless signals 1334. According to some embodiments, the wireless communication antenna(s) 1332 may comprise a plurality of discrete antennas, antenna arrays, or any combination thereof.

Depending on desired functionality, the wireless communication interface 1330 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project 3" (3GPP2). 3GPP and 3GPP2 documents are publicly available. A WLAN may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 1340. Sensors 1340 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 1380 capable of receiving signals 1384 from one or more GNSS satellites using an antenna 1382 (which could be the same as antenna 1332). Positioning based on GNSS signal measurement can be utilized to complement and/or incorporate the techniques described herein. The GNSS receiver 1380 can extract a position of the UE 105, using conventional techniques, from GNSS satellites 110 of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 1380 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1380 is illustrated in FIG. 13 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1310, DSP 1320, and/or a processing unit within the wireless communication interface 1330 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 1310 or DSP 1320.

The UE 105 may further include and/or be in communication with a memory 1360. The memory 1360 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1360 of the UE 105 also can comprise software elements (not shown in FIG. 13), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1360 that are executable by the UE 105 (and/or processing unit(s) 1310 or DSP 1320 within UE 105). In an aspect, then such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

Clause 1. A method of wireless communication at a base station for wireless positioning a user equipment (UE), the method comprising: transmitting, to a different device, assistance indicating a location of antenna reference points (ARPs) of the base station for a first set of TRPs configured for receiving uplink (UL) sounding reference signals (SRSs) different from a location of antenna reference points (ARPs) of the base station for a second set of TRPs configured for transmitting downlink (DL) position reference signals (PRSs). The method also comprises performing a measurement of a UL reference signal received by the first set of TRPs. And the method further comprises transmitting the measurement to the different device.

Clause 2. The method of clause 1, wherein the assistance data comprises a location of a common reference point for the first set of TRPs and the second set of TRPs, and wherein a location of an ARP of the first set of TRPs is defined with a relative location with respect to the location of the common reference point.

Clause 3. The method of any clauses of 1-2, wherein the location of the ARP of the first set of TRPs is defined with an offset with respect to the location of the common reference point wherein the offset comprises: a translation; a rotation; or any combination thereof.

Clause 4. The method of any clauses of 1-3, wherein the assistance data comprises: a first location of a first common reference point for the first set of TRPs; and a second location of a second common reference point for the second set of TRPs, different from the first location, wherein a location of an ARP of the first set of TRPs is defined with an offset with respect to the location of the first common reference point.

Clause 5. The method of any clauses of 1-4, wherein the offset comprises: a translation; a rotation; or any combination thereof.

Clause 6. The method of any clauses of 1-5, wherein the different device comprises a location server or the UE.

Clause 7. A method of wireless communication at a UE for wireless positioning, the method comprising: transmitting a UL reference signal to a base station. The method also comprises receiving, from a network node, assistance data indicating a location of antenna reference points (ARPs) of the base station for a first set of TRPs configured for receiving uplink (UL) sounding reference signals (SRS s) different from a location of antenna reference points (ARPs) of the base station for a second set of TRPs configured for transmitting downlink (DL) position reference signals (PRSs).

Clause 8. The method of clause 7, wherein the network node comprises a location server or the base station.

Clause 9. The method of any clauses of 7-8, wherein the assistance data comprises a location of a common reference point for the first set of TRPs and the second set of TRPs, and wherein a location of an ARP of the first set of TRPs is defined with a relative location with respect to the location of the common reference point.

Clause 10. The method of any clauses of 7-9, wherein the location of the ARP of the first set of TRPs is defined with an offset with respect to the location of the common reference point, wherein the offset comprises: a translation; a rotation; or any combination thereof.

Clause 11. The method of any clauses of 7-10, wherein the assistance data comprises: a first location of a first common reference point for the first set of TRPs; and a second location of a second common reference point for the second set of TRPs, different from the first location, wherein a location of an ARP of the first set of TRPs is defined with an offset with respect to the location of the first common reference point.

Clause 12. The method of any clauses of 7-11, wherein the offset comprises: a translation; a rotation; or any combination thereof.

Clause 13. The method of clauses of 7-12, wherein the assistance data further includes a measurement of the UL reference signal.

Clause 14. A server for wireless positioning a user equipment (UE) comprising: a transceiver, a memory, and one or more processing units communicatively coupled with the transceiver and the memory. The one or more processing units is configured to: transmit, to a different device, assistance indicating a location of antenna reference points (ARPs) of the base station for a first set of TRPs configured for receiving uplink (UL) sounding reference signals (SRSs) different from a location of antenna reference points (ARPs) of the base station for a second set of TRPs configured for transmitting downlink (DL) position reference signals (PRSs). The one or more processing units is also configured to perform a measurement of a UL reference signal received by the first set of TRPs; and transmit the measurement to the different device.

Clause 15. The server of clause 14, wherein the assistance data comprises a location of a common reference point for the first set of TRPs and the second set of TRPs, and wherein a location of an ARP of the first set of TRPs is defined with a relative location with respect to the location of the common reference point.

Clause 16. The server of any clauses of 14-15, wherein the location of the ARP of the first set of TRPs is defined with an offset with respect to the location of the common reference point wherein the offset comprises: a translation; a rotation; or any combination thereof.

Clause 17. The server of any clauses of 14-16, wherein the assistance data comprises: a first location of a first common reference point for the first set of TRPs; and a second location of a second common reference point for the second set of TRPs, different from the first location, wherein a location of an ARP of the first set of TRPs is defined with an offset with respect to the location of the first common reference point.

Clause 18. The server of any clauses of 14-17, wherein the offset comprises: a translation; a rotation; or any combination thereof.

Clause 19. The server of any clauses of 14-18, wherein the different device comprises a location server or the UE.

Clause 20. A server for user equipment (UE) for wireless positioning comprising: a transceiver, a memory, and one or more processing units communicatively coupled with the transceiver and the memory. The one or more processing units is configured to: transmit a UL reference signal to a base station, and receive, from a network node, assistance data indicating a location of antenna reference points (ARPs) of the base station for a first set of TRPs configured for receiving uplink (UL) sounding reference signals (SRSs) different from a location of antenna reference points (ARPs) of the base station for a second set of TRPs configured for transmitting downlink (DL) position reference signals (PRSs), wherein the assistance data further indicates a measurement of the UL reference signal.

Clause 21. The UE of clause 20, wherein the network node comprises a location server or the base station.

Clause 22. The UE of any clause of 20-21, wherein the assistance data comprises a location of a common reference point for the first set of TRPs and the second set of TRPs, and wherein a location of an ARP of the first set of TRPs is defined with a relative location with respect to the location of the common reference point.

Clause 23. The UE of any clause of 20-22, wherein the location of the ARP of the first set of TRPs is defined with an offset with respect to the location of the common reference point, wherein the offset comprises: a translation; a rotation; or any combination thereof.

Clause 24. The UE of any clause of 20-23, wherein the assistance data comprises: a first location of a first common reference point for the first set of TRPs; and a second location of a second common reference point for the second set of TRPs, different from the first location, wherein a location of an ARP of the first set of TRPs is defined with an offset with respect to the location of the first common reference point.

Clause 25. The UE of any clause of 20-24, wherein the offset comprises: a translation; a rotation; or any combination thereof.

Clause 26. The UE clause of 20-25, wherein the assistance data further includes a measurement of the UL reference signal.

What is claimed is:

1. A method of wireless communication at a base station for wireless positioning a user equipment (UE), the method comprising:
   transmitting, to a different device, assistance data indicating a location of antenna reference points (ARPs) of the base station for a first set of transmission reception points (TRPs) configured for receiving uplink (UL) sounding reference signals (SRSs) different from a location of antenna reference points (ARPs) of the base station for a second set of TRPs configured for transmitting downlink (DL) position reference signals (PRSs);
   performing a measurement of a UL reference signal received by the first set of TRPs; and
   transmitting the measurement to the different device.

2. The method of claim 1, wherein the assistance data comprises a location of a common reference point for the first set of TRPs and the second set of TRPs, and wherein a location of an ARP of the first set of TRPs is defined with a relative location with respect to the location of the common reference point.

3. The method of claim 2, wherein the location of the ARP of the first set of TRPs is defined with an offset with respect to the location of the common reference point wherein the offset comprises:
   a translation;
   a rotation; or
   any combination thereof.

4. The method of claim 1, wherein the assistance data comprises:
   a first location of a first common reference point for the first set of TRPs; and
   a second location of a second common reference point for the second set of TRPs, different from the first location, wherein a location of an ARP of the first set of TRPs is defined with an offset with respect to the location of the first common reference point.

5. The method of claim 4, wherein the offset comprises:
   a translation;
   a rotation; or
   any combination thereof.

6. The method of claim 1, wherein the different device comprises a location server or the UE.

7. A method of wireless communication at a UE for wireless positioning, the method comprising:
   transmitting an uplink (UL) reference signal to a base station; and receiving, from a network node, assistance data indicating a location of antenna reference points (ARPs) of the base station for a first set of TRPs configured for receiving uplink (UL) sounding reference signals (SRSs) different from a location of antenna reference points (ARPs) of the base station for a second set of TRPs configured for transmitting downlink (DL) position reference signals (PRSs).

8. The method of claim 7, wherein the network node comprises a location server or the base station.

9. The method of claim 7, wherein the assistance data comprises a location of a common reference point for the first set of TRPs and the second set of TRPs, and wherein a location of an ARP of the first set of TRPs is defined with a relative location with respect to the location of the common reference point.

10. The method of claim 9, wherein the location of the ARP of the first set of TRPs is defined with an offset with respect to the location of the common reference point, wherein the offset comprises:
a translation;
a rotation; or
any combination thereof.

11. The method of claim 7, wherein the assistance data comprises:
a first location of a first common reference point for the first set of TRPs; and
a second location of a second common reference point for the second set of TRPs, different from the first location, wherein a location of an ARP of the first set of TRPs is defined with an offset with respect to the location of the first common reference point.

12. The method of claim 11, wherein the offset comprises:
a translation;
a rotation; or
any combination thereof.

13. The method of claim 7, wherein the assistance data further includes a measurement of the UL reference signal.

14. A base station for wireless positioning a user equipment (UE) comprising:
a transceiver;
a memory; and
one or more processing units communicatively coupled with the transceiver and the memory, the one or more processing units configured to:
transmit, to a different device, assistance data indicating a location of antenna reference points (ARPs) of the base station for a first set of transmission reception points (TRPs) configured for receiving uplink (UL) sounding reference signals (SRSs) different from a location of antenna reference points (ARPs) of the base station for a second set of TRPs configured for transmitting downlink (DL) position reference signals (PRSs);
perform a measurement of a UL reference signal received by the first set of TRPs; and
transmit the measurement to the different device.

15. The base station of claim 14, wherein the assistance data comprises a location of a common reference point for the first set of TRPs and the second set of TRPs, and wherein a location of an ARP of the first set of TRPs is defined with a relative location with respect to the location of the common reference point.

16. The base station of claim 15, wherein the location of the ARP of the first set of TRPs is defined with an offset with respect to the location of the common reference point wherein the offset comprises:
a translation;
a rotation; or
any combination thereof.

17. The base station of claim 14, wherein the assistance data comprises:
a first location of a first common reference point for the first set of TRPs; and
a second location of a second common reference point for the second set of TRPs, different from the first location, wherein a location of an ARP of the first set of TRPs is defined with an offset with respect to the location of the first common reference point.

18. The base station of claim 17, wherein the offset comprises:
a translation;
a rotation; or
any combination thereof.

19. The base station of claim 14, wherein the different device comprises a location server or the UE.

20. A user equipment (UE) for wireless positioning, the UE comprising:
a transceiver;
a memory; and
one or more processors communicatively coupled with the transceiver and the memory, wherein the one or more processors are configured to:
transmit an uplink (UL) reference signal to a base station; and
receive, from a network node, assistance data indicating a location of antenna reference points (ARPs) of the base station for a first set of TRPs configured for receiving uplink (UL) sounding reference signals (SRSs) different from a location of antenna reference points (ARPs) of the base station for a second set of TRPs configured for transmitting downlink (DL) position reference signals (PRSs).

21. The UE of claim 20, wherein the network node comprises a location server or the base station.

22. The UE of claim 20, wherein the assistance data comprises a location of a common reference point for the first set of TRPs and the second set of TRPs, and wherein a location of an ARP of the first set of TRPs is defined with a relative location with respect to the location of the common reference point.

23. The UE of claim 22, wherein the location of the ARP of the first set of TRPs is defined with an offset with respect to the location of the common reference point, wherein the offset comprises:
a translation;
a rotation; or
any combination thereof.

24. The UE of claim 22, wherein the assistance data comprises:
a first location of a first common reference point for the first set of TRPs; and
a second location of a second common reference point for the second set of TRPs, different from the first location, wherein a location of an ARP of the first set of TRPs is defined with an offset with respect to the location of the first common reference point.

25. The UE of claim 24, wherein the offset comprises:
a translation;
a rotation; or
any combination thereof.

26. The UE of claim 20, wherein the assistance data further includes a measurement of the UL reference signal.

\* \* \* \* \*